United States Patent
Matsuda et al.

(10) Patent No.: US 8,209,621 B2
(45) Date of Patent: Jun. 26, 2012

(54) IMAGE PROCESSING SYSTEM, IMAGE PROCESSING APPARATUS AND INFORMATION PROCESSING APPARATUS

(75) Inventors: Hideyuki Matsuda, Suita (JP); Kazumi Sawayanagi, Itami (JP); Toshihiko Otake, Ikeda (JP); Masao Hosono, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 134 days.

(21) Appl. No.: 12/860,654

(22) Filed: Aug. 20, 2010

(65) Prior Publication Data

US 2011/0054908 A1 Mar. 3, 2011

(30) Foreign Application Priority Data

Aug. 25, 2009 (JP) .................................. 2009-194872

(51) Int. Cl.
G06F 3/048 (2006.01)
(52) U.S. Cl. ........ 715/764; 715/741; 704/275; 704/270; 704/270.1; 379/88.01; 358/1.15
(58) Field of Classification Search .................. 704/233, 704/253, 226–228, 232, 251, 270, 270.1, 704/275, 246; 455/445, 563, 560, 422.1; 379/386, 283, 80, 351, 88.01–88.03; 381/94.3, 381/71.1; 382/100; 345/204, 2.1; 358/1.1–1.15; 715/764, 741
See application file for complete search history.

(56) References Cited

U.S. PATENT DOCUMENTS

| | | | | |
|---|---|---|---|---|
| 5,283,888 A * | 2/1994 | Dao et al. ..................... 709/237 |
| 5,659,597 A * | 8/1997 | Bareis et al. .................. 455/563 |
| 5,768,351 A * | 6/1998 | England ...................... 379/93.37 |
| 5,943,400 A * | 8/1999 | Park ........................... 379/88.22 |
| 5,983,186 A * | 11/1999 | Miyazawa et al. ............. 704/275 |
| 6,023,473 A * | 2/2000 | Reine et al. .................... 370/463 |
| 6,044,341 A * | 3/2000 | Takahashi ..................... 704/226 |
| 6,065,041 A * | 5/2000 | Lum et al. ..................... 709/203 |
| 6,088,428 A * | 7/2000 | Trandal et al. ............. 379/88.02 |
| 6,341,307 B1 * | 1/2002 | Lum et al. ..................... 709/220 |
| 2003/0011633 A1* | 1/2003 | Conley et al. ................. 345/762 |
| 2003/0097190 A1* | 5/2003 | Watanabe et al. ............... 700/17 |
| 2003/0218629 A1 | 11/2003 | Terashima et al. |
| 2004/0085298 A1* | 5/2004 | Enmei .......................... 345/169 |
| 2005/0046887 A1 | 3/2005 | Shibata et al. |
| 2005/0108651 A1* | 5/2005 | Kitajima et al. .............. 715/764 |
| 2005/0188313 A1* | 8/2005 | Matthews et al. ............. 715/741 |
| 2006/0106803 A1* | 5/2006 | Takeuchi et al. .................. 707/9 |
| 2007/0109577 A1* | 5/2007 | Yoshida ....................... 358/1.13 |

(Continued)

FOREIGN PATENT DOCUMENTS

JP 2003-308295 A 10/2003
(Continued)

*Primary Examiner* — Vijay B Chawan
(74) *Attorney, Agent, or Firm* — Buchanan Ingersoll & Rooney PC (57) ABSTRACT

An image processing system includes an information processing apparatus and an image processing apparatus connected to each other via a network. The information processing apparatus has an application installed thereon to give a new function to the image processing apparatus. The image processing apparatus transmits to the information processing apparatus, voice data obtained by a microphone of the image processing apparatus and data set via an operation screen customized according to the application. The information processing apparatus determines answer information indicating an action to be taken by the image processing apparatus, based on the received voice data, a dictionary owned by the application and the data set via the operation screen, and then transmits the determined answer information to the image processing apparatus. The image processing apparatus takes an action according to the answer information received therefrom.

14 Claims, 7 Drawing Sheets

U.S. PATENT DOCUMENTS

2007/0236730 A1 * 10/2007 Takeuchi et al. ............ 358/1.15

FOREIGN PATENT DOCUMENTS

| | | |
|---|---|---|
| JP | 2003-330324 A | 11/2003 |
| JP | 2004-038252 A | 2/2004 |
| JP | 3778190 B2 | 5/2006 |
| JP | 3812555 B2 | 8/2006 |
| JP | 3812556 B2 | 8/2006 |
| JP | 2006-330576 A | 12/2006 |
| JP | 2007-279974 A | 10/2007 |

* cited by examiner

IMAGE PROCESSING SYSTEM, IMAGE PROCESSING APPARATUS AND INFORMATION PROCESSING APPARATUS

This application claims priority under 35 U.S.C. §119 to Japanese Patent Application No. 2009-194872 filed on Aug. 25, 2009, the entire disclosure of which is incorporated herein by reference in its entirety.

BACKGROUND OF THE INVENTION

1. Field of the Invention

The present invention relates to an image processing system in which an image processing apparatus such as a MFP (Multi Function Peripheral) that is a multifunctional digital machine and an information processing apparatus such as a personal computer are interconnected via a network, and an image processing apparatus and an information processing apparatus preferably employed in this image processing system.

2. Description of the Related Art

The following description sets forth the inventor's knowledge of related art and problems therein and should not be construed as an admission of knowledge in the prior art.

An image processing system having been conventionally known is capable of enabling such an image processing apparatus mentioned above, for example a MFP, to implement a function of an application installed on a personal computer that is an information processing apparatus. Thus, without installing an exclusive application on the image processing apparatus, enhanced functionality can be provided to the image processing apparatus (for example, Japanese Patents No. 3778190, No. 3812555 and No. 3812556).

In this image processing system, the image processing apparatus executes processing according to the application. Therefore, under the control of this application, various operation screens to be displayed on a display of an operation panel for example, of the image processing apparatus are created and old operation screens are replaced with the new created ones, so that the image processing apparatus could be enabled to implement a function provided by this application.

On the other hand, an image processing apparatus having been conventionally known allows users to perform an operation by voice entry via an operation screen displayed on an operation panel thereof (for example, Japanese Unexamined Laid-open Patent Publications No. 2003-308295 and No. 2004-038252). In such an image processing apparatus capable of accepting voice entry, a voice dictionary is recorded in advance for each operation screen. And by comparing obtained voice data to a voice dictionary, the image processing apparatus identifies the voice data, then determines an action that matches the voice data and answer information indicating a next screen, for example. And according to this answer information, the image processing apparatus takes an action.

However, the image processing system capable of enabling an image processing apparatus to implement a function of an application installed on an external information processing apparatus, like that mentioned above, does not allow users to perform an operation by voice entry via an operation screen that is displayed on a display of the image processing apparatus according to the application. This is problematical in terms of usefulness.

Also, this cannot be resolved with the technology described in the Japanese Unexamined Laid-open Patent Publications No. 2003-308295 and No. 2004-038252.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing system that is capable of enabling an image processing apparatus to implement a function by an application installed on an external information processing apparatus and allowing users to perform an operation by voice entry via an operation screen that is displayed on a display of the image processing apparatus according to the application.

It is another object of the present invention to provide an image processing apparatus preferably employed in this image processing system.

It is yet another object of the present invention to provide an information processing apparatus preferably employed in this image processing system.

According to a first aspect of the present invention, an image processing system includes an image processing apparatus and an information processing apparatus interconnected via a network, wherein:

the image processing apparatus includes:
  a display that displays on itself, a first operation screen customized by an application that is installed on the information processing apparatus to enable the image processing apparatus to implement a new function;
  a voice data obtainer that obtains voice data from user-made voice entered about an operation screen displayed on the display; and
  a transmitter that transmits the voice data obtained by the voice data obtainer and value data entered via the first operation screen, to the information processing apparatus, the information processing apparatus comprises:
  an application memory that records the application in itself;
  a receiver that receives the voice data and the value data entered via the first operation screen, from the transmitter of the image processing apparatus;
  a determiner that determines answer information indicating an action to be taken by the image processing apparatus, based on the received voice data, a voice dictionary owned by the application and the value data entered via the first operation screen; and
  a transmitter that transmits the determined answer information to the image processing apparatus, and the image processing apparatus further comprises:
  a controller that takes an action according to the answer information received from the information processing apparatus.

According to a second aspect of the present invention, an image processing system includes an image processing apparatus and an information processing apparatus interconnected via a network, wherein:

the image processing apparatus includes:
- a display that display on itself, an operation screen customized by an application that is installed on the information processing apparatus to enable the image processing apparatus to implement a new function;
- a register that registers the application and further registers a voice data sample serving as a value set for each setting item according to this application;
- a creator that creates a voice dictionary about the operation screen based on screen information of the operation screen and the registered voice data samples, when the screen information is received from the information processing apparatus;
- a voice data obtainer that obtains voice data from user-made voice about the operation screen;
- a determiner that determines answer information that matches the voice data obtained by the voice data obtainer, using the voice dictionary created by the creator; and
- a controller that transmits to the information processing apparatus, a request for screen information of a next operation screen if the answer information determined by the determiner includes an instruction to update the screen, meanwhile takes an action according to the answer information if the answer information does not include an instruction to update the screen, and the information processing apparatus comprises:
- an application memory that records the application in itself; and
- a transmitter that transmits to the image processing apparatus, a voice data sample to be registered and screen information of an operation screen.

According to a third aspect of the present invention, an image processing system includes an image processing apparatus and an information processing apparatus interconnected via a network, wherein:

the image processing apparatus includes:
- a display that is capable of displaying a first operation screen customized by an application that is installed on the information processing apparatus to enable the image processing apparatus to implement a new function, and displaying at the same time, the first operation screen and a second operation screen of the image processing apparatus' own according to the application;
- a voice dictionary creator that creates one voice dictionary based on a voice dictionary about the entire second operation screen;
- a voice data obtainer that is capable of continuously obtaining voice data from user-made voice entered about the first operation screen, as first voice data;
- a judger that judges whether or not the first voice data obtained by the voice data obtainer matches any record in the voice dictionary created by the voice dictionary creator, by comparing the first voice data to the voice dictionary, and if judges that the first voice data matches a record in the voice dictionary, further judges whether or not the first voice data should be given to the application; and
- a transmitter that transmits the first voice data continuously obtained by the voice data obtainer, to the information processing apparatus, and if the judger judges that the first voice data matches a records of voice data in the voice dictionary and also judges that the first voice data should be given to the application, further transmits thereto the voice data of the matching record, as second voice data, the information processing apparatus comprises:
- an application memory that records the application in itself;
- a receiver that receives the first voice data and the second voice data from the image processing apparatus;
- a determiner that determines answer information that matches the first voice data and the second voice data received therefrom, after the last voice data is received; and
- a transmitter that transmits the determined answer information to the image processing apparatus, and the image processing apparatus further comprises:
- a controller that takes an action according to the answer information received from the information processing apparatus.

According to a forth aspect of the present invention, an image processing apparatus connected to an information processing apparatus via a network, includes:
- a display that displays on itself, a first operation screen customized by an application that is installed on the information processing apparatus to enable the image processing apparatus to implement a new function;
- a voice data obtainer that obtains voice data from user-made voice entered about the first operation screen displayed on the display;
- a transmitter that transmits the voice data obtained by the voice data obtainer and value data entered via the first screen data, to the information processing apparatus;
- a receiver that receives from the information processing apparatus, answer information matching the voice data, which is determined in the information processing apparatus based on a voice dictionary owned by the application and the value data entered via the first operation screen; and
- a controller that takes an action according to the answer information received therefrom.

According to a fifth aspect of the present invention, an image processing apparatus connected to an information processing apparatus via a network, includes:
- a display that displays on itself, an operation screen customized by an application that is installed on the information processing apparatus to enable the image processing apparatus to implement a new function;
- a register that registers the application and further registers a voice data sample serving as a value for each setting item of this application;
- a creator that creates a voice dictionary about the operation screen based on screen information of the operation screen and the registered voice data samples, when the screen information is received from the information processing apparatus;
- a voice data obtainer that obtains voice data from user-made voice entered about the operation screen;
- a determiner that determines answer information that matches the voice data obtained by the voice data obtainer, using the voice dictionary created by the creator; and
- a controller that transmits to the information processing apparatus, a request for screen information of a next operation screen if the answer information determined by the determiner includes an instruction to update the screen, meanwhile takes an action according to the answer information if the answer information does not includes an instruction to update the screen.

According to a sixth aspect of the present invention, an image processing apparatus connected to an information processing apparatus via a network, includes:

a display that is capable of displaying a first operation screen customized by an application that is installed on the information processing apparatus to enable the image processing apparatus to implement a new function, and displaying at the same time, the first operation screen and a second operation screen of the image processing apparatus's own according to the application;

a voice dictionary creator that creates one voice dictionary based on a voice dictionary about the entire second operation screen;

a voice data obtainer that continuously obtains voice data from user-made voice entered about the first operation screen, as first voice data;

a judger that judges whether or not the first voice data obtained by the voice data obtainer matches any record in the voice dictionary created by the voice dictionary creator, by comparing the first voice data to the voice dictionary, and if judges that the first voice data matches a record in the voice dictionary, further judges whether or not the first voice data should be given to the application a transmitter that transmits the first voice data continuously obtained by the voice data obtainer, to the information processing apparatus, and if the judger judges that the first voice data matches a records of voice data in the voice dictionary and also judges that the first voice data should be given to the application, further transmits thereto the voice data of the matching record, as second voice data;

a receiver that receives answer information that matches the first voice data and the second voice data, determined by the information processing apparatus after the information processing apparatus receives the last voice data; and a controller that takes an action according to the answer information received therefrom.

According to a seventh aspect of the present invention, an information processing apparatus is employed in an image processing system comprising an image processing apparatus and an information processing apparatus that are interconnected via a network, wherein:

the image processing apparatus comprises:

a display that is capable of displaying a first operation screen customized by an application that is installed on the information processing apparatus to enable the image processing apparatus to implement a new function, and displaying at the same time, the first operation screen and a second operation screen of the image processing apparatus' own according to the application;

a voice dictionary creator that creates one voice dictionary based on a voice dictionary about the entire second operation screen;

a voice data obtainer that is capable of continuously obtaining voice data from user-made voice entered about the first operation screen, as first voice data;

a judger that judges whether or not the first voice data obtained by the voice data obtainer matches any record in the voice dictionary created by the voice dictionary creator, by comparing the first voice data to the voice dictionary, and if judges that the first voice data matches a record in the voice dictionary, further judges whether or not the first voice data should be given to the application; and a transmitter that transmits the first voice data continuously obtained by the voice data obtainer, to the information processing apparatus, and if the judger judges that the first voice data matches a records of voice data in the voice dictionary and also judges that the first voice data should be given to the application, further transmits thereto the voice data of the matching record, as second voice data, the information processing apparatus comprises:

an application memory that records the application in itself;

a receiver that receives the first voice data and the second voice data from the image processing apparatus;

a determiner that determines answer information that matches the first voice data and the second voice data received therefrom, after the last voice data is received; and a transmitter that transmits the determined answer information to the image processing apparatus, and the image processing apparatus further comprises:

a controller that takes an action according to the answer information received from the information processing apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
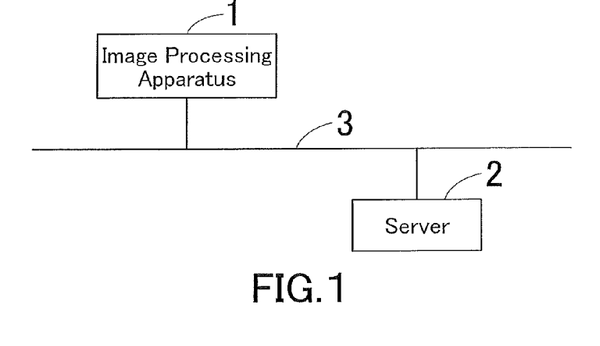
FIG. 1 is a view showing a configuration of an image processing system according to one embodiment of the present invention.

FIG. 1 is a view showing a configuration of an image processing system according to one embodiment of the present invention.

As shown in FIG. 1, this image processing system includes a MFP 1 that is an image processing apparatus collectively having the scan function, the copy function, the facsimile function, the print function and other functions, and an application server 2 that is an information processing apparatus such as a personal computer. And the MFP 1 and the application server 2 are interconnected via a network 3.

Figure 2:
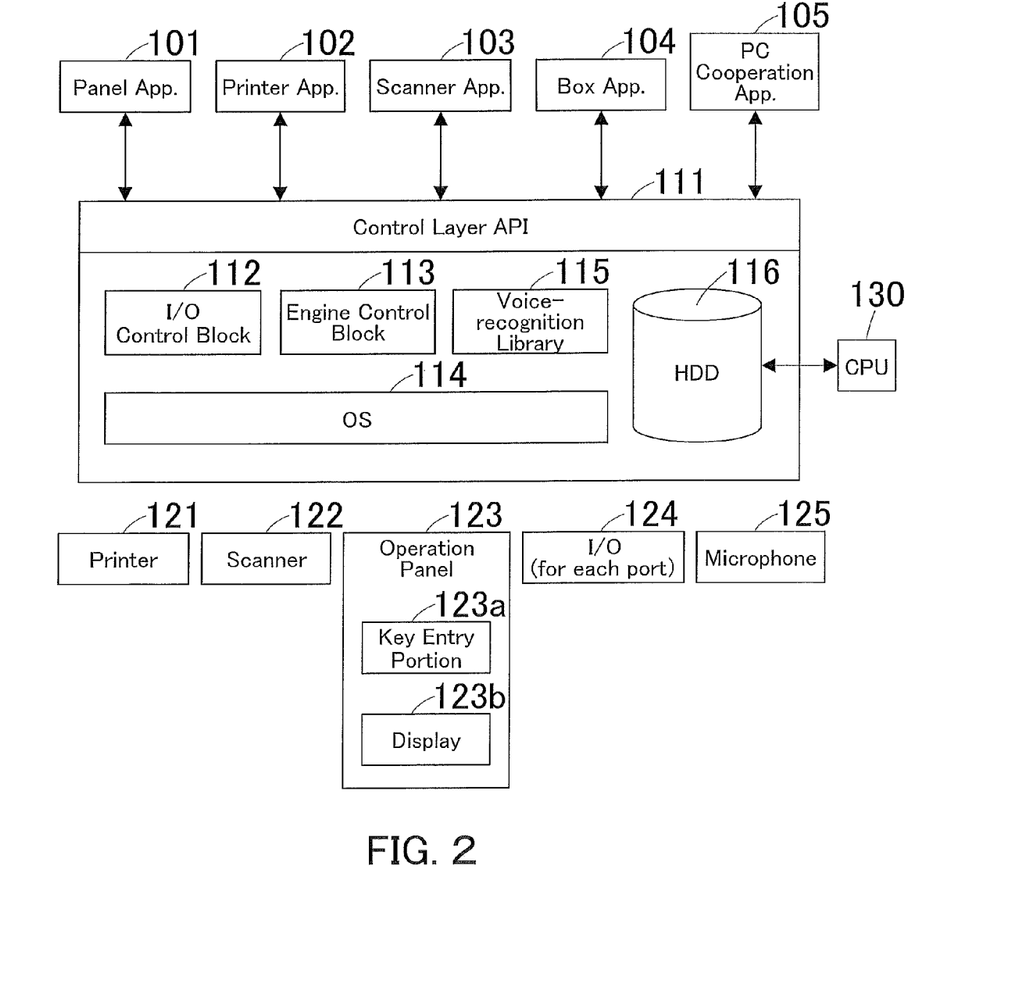
FIG. 2 is a block diagram showing a system configuration of an image processing apparatus.

FIG. 2 is a view showing a system configuration of the MFP 1.

As shown in FIG. 2, this MFP 1 includes a panel application 101 to control an operation panel, a printer application 102 to control a printer, a scanner application 103 to control a scanner, a Box application 104 to control Boxes (hard disk drive) holding image data, a PC cooperation application 105 to make the MFP 1 execute processing according to an application installed on the application server 2, by cooperatively working with this application, and a CPU 130 that controls all operations of the MFP 1 by executing these applications.

Furthermore, the MFP 1 includes an control layer API (Application Program Interface) 111, an I/O control block 112, an engine control block 113, an OS (Operating System) 114 and a voice-recognition library 115 and a hard disk drive 116.

The voice-recognition library 115 converts to code data voice data obtained from user-made voice. The hard disk drive 116 records in itself a voice dictionary 30 like that shown in FIG. 5. By comparing the code data obtained by the voice-recognition library 115, to the records of code data stored in the voice dictionary 30, the message of the user's voice (what the user's voice means) is identified. In the voice dictionary 30, voice data samples and actions that match the respective voice data samples are recorded with their connections.

Furthermore, the MFP 1 includes a printer 121 that is hardware, a scanner 122 that is a reader, an operation panel 123, an I/O 124, and a microphone 125 that is a voice data obtainer. The operation panel 123 includes a key entry portion 123a having a numeric key pad, a start key, a reset key and other keys, and a display 123b that is a liquid crystal display with touch-panel functionality, for example.

Figure 3:
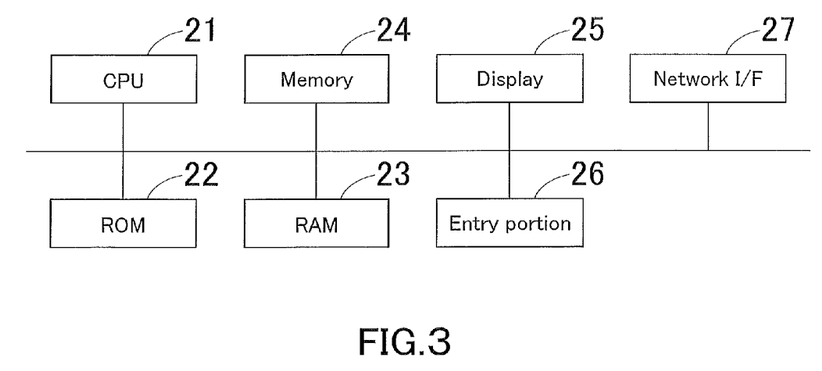
FIG. 3 is a block diagram showing a configuration of an information processing apparatus.

FIG. 3 is a block diagram showing a configuration of the application server 2. The application sever 2 has a common configuration with standard personal computers.

The application server 2 includes a CPU 21, a ROM 22, a RAM 23, a memory 24, a display 25, an entry portion 26, a network interface (network I/F) 27 and etc.

The CPU 21 centrally controls the application server 2 by executing a program recorded in the ROM 22 or the memory 24. In this embodiment, the CPU 21 exchanges data with the MFP 1 according to an application to enable the MFP 1 to implement a new function (hereinafter, this application will be referred to as "OpenAPI cooperation application" or simply referred to as "app.").

The ROM 22 is a recording medium that records in itself a program to be executed by the CPU 22 and other data.

The RAM 23 provides a work area for the CPU 21 to execute processing according to an operation program.

The memory 24 is a recording medium such as a hard disk drive, and records in itself the OpenAPI cooperation application, the voice dictionary and other data.

The display 25 is a CRT, a liquid crystal display and etc., and displays on itself various messages and screens.

The entry portion 26 is used by users for entry operation, and includes a keyboard, a mouse and etc.

The network interface 27 serves as a communicator that exchanges data with the MFP 1 and other external devices via the network 3.

Figure 4:
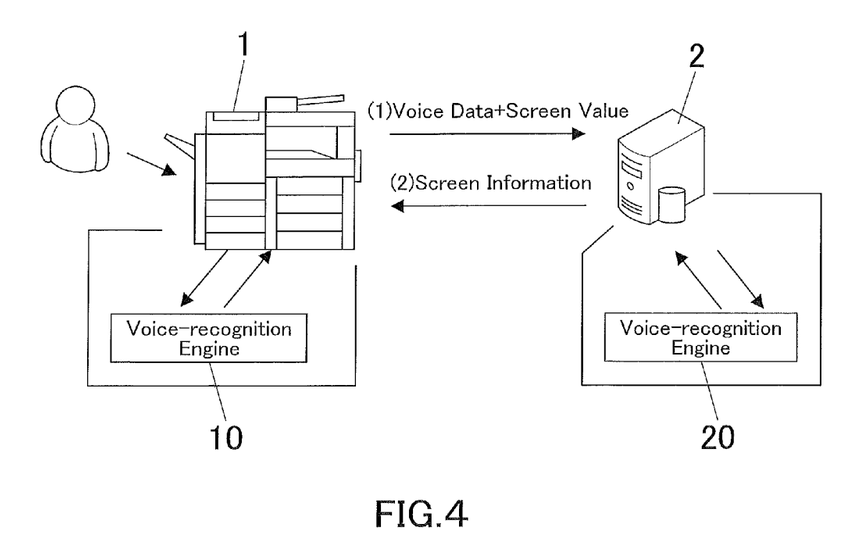
FIG. 4 is a view to explain one example of a procedure that is executed by the image processing apparatus and the information processing apparatus when the mode to enable the image processing apparatus to implement a new function (the OpenAPI cooperation mode) is set to "ON" according to an application installed on the information processing apparatus.

FIG. 4 is a view to explain one example of a procedure that is executed by the MFP 1 and the application server 2 when the mode to enable the MFP 1 to implement a function of the application server 2 is set to "ON" according to the OpenAPI cooperation application.

The MFP 1 further includes a voice-recognition engine 10. This voice-recognition engine 10 includes the voice-recognition library 115, the voice dictionary 30 (see FIG. 5) and others, and identifies the message of user-made voice. Meanwhile, the application server 2 also includes the voice-recognition engine 20. The voice recognition engine 20 converts to code data, voice data received from the MFP 1 using the voice-recognition library, and then identifies the message of the voice by comparing the code data to the voice dictionary recorded in the memory 24.

The OpenAPI cooperation mode is turned "ON" by operating the MFP 1 and the OpenAPI cooperation application is activated. Then, an operation screen customized by the OpenAPI cooperation application, is displayed on the display 123b of the operation panel 123 of the MFP 1.

Subsequently, a user speaks to perform an operation, then the microphone obtains voice data from the user-made voice. And the obtained voice data and data entered via the operation screen (a screen value) are transmitted to the application sever 2. The screen value serves to identify the operation screen. It may be any value displayed on the screen or may be a value obtained from user-made voice.

According to the OpenAPI cooperation application, the application server 2 identifies the message of voice using the voice-recognition engine 20, and determines answer information for the MFP 1 based on the identified message and screen data received form the MFP 1, and returns it to the MFP 1.

For example, if the answer information is an instruction to update the screen, the application server 2 transmits to the MFP 1, screen information of a next operation screen. Meanwhile, if the answer information is an instruction to execute a job, the application server 2 transmits that instruction to the MFP 1.

Receiving the answer information from the application server 2, the MFP 1 takes an action according to the answer information. If the answer information is an instruction to update the screen, the MFP 1 displays a next operation screen received therefrom. Meanwhile, if the answer information is an instruction to perform a predetermined operation, the MFP 1 performs that operation.

In this way as described above, users can perform an operation by voice entry via an operation screen that is displayed on the display 123b of the MFP 1 according to the OpenAPI cooperation application installed on the application server 2.

The MFP 1 can display an operation screen of its own (a second operation screen), controlled by an application installed on the MFP 1, not the one controlled by the OpenAPI cooperation application. When the OpenAPI cooperation mode is turned "ON", the MFP 1 calls out the second operation screen according to the OpenAPI cooperation application, then displays the second operation screen, or alternatively, displays the second operation screen and the first operation screen customized by the OpenAPI cooperation application, at the same time.

As described above, when a user performs an operation by voice entry while the first operation screen and the second operation screen are displayed at the same time, the action to take depends on the setting of the OpenAPI cooperation application. Specifically, in this embodiment, if voice data is identified using a voice dictionary of the MFP 1, the MFP 1 takes an action about the second operation screen, meanwhile if voice data is identified using a voice dictionary of the OpenAPI cooperation application installed on the application server 2 and answer information that matches the voice data is determined, the MFP 1 takes an action about the first operation screen according to the answer information from the application server 2.

Figure 6:
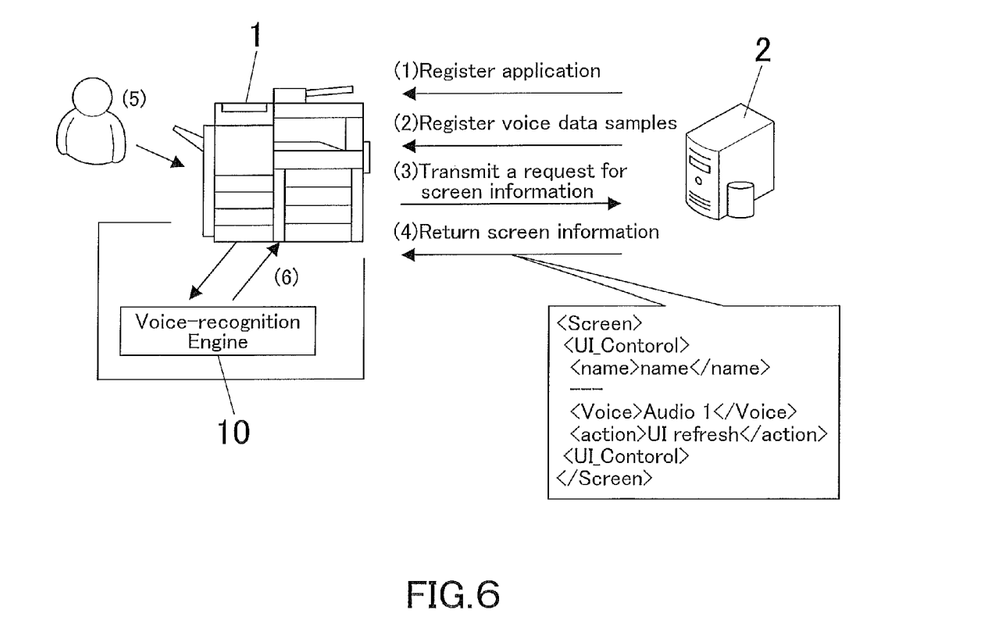
FIG. 6 is a view to explain another example of a procedure that is executed by the image processing apparatus and the information processing apparatus when the OpenAPI cooperation mode is turned "ON"

FIG. 6 is a view to explain another example of a procedure that is executed by the MFP 1 and the application server 2 when the OpenAPI cooperation mode is turned "ON".

In this example, the MFP 1 executes processing on user-made voice when the OpenAPI cooperation mode is turned "ON".

Figure 5:
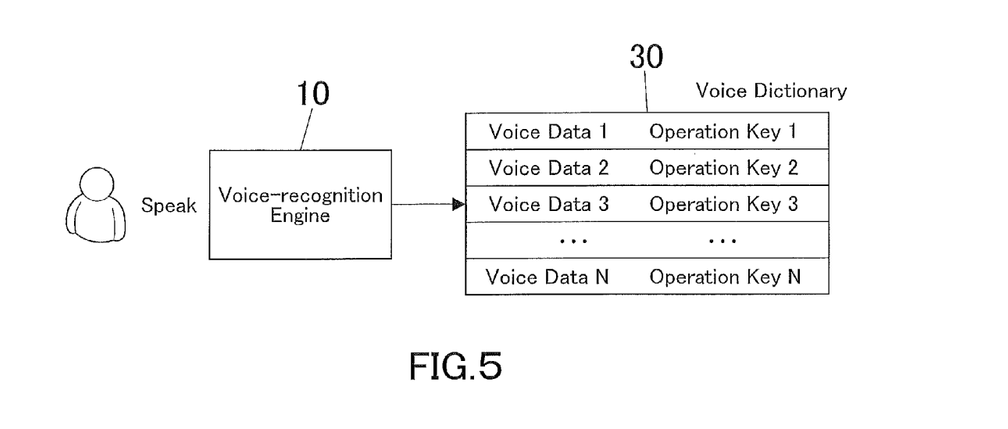
FIG. 5 is a view showing one example of a voice dictionary.

Initially, the OpenAPI cooperation application installed on the application server 2 is registered in the MFP 1 (see (1) of FIG. 6), and voice data samples are also registered therein for the respective setting items of the OpenAPI cooperation application, as shown in FIG. 5 (see (2) of FIG. 6).

When the OpenAPI cooperation mode is turned "ON", the MFP 1 transmits a request for screen information to the application server 2 (see (3) of FIG. 6). In response to the request, the application server 2 transmits the screen information to the MFP 1 (see (4) of FIG. 6).

This screen information is described in XML, and includes a set of the following descriptions: the description "<Screen>...</Screen>" indicating that this is screen information; the description "<UI Control> ... </UI Control>" indicating to what operation screen the screen information relates to; the description "<name> Name </name>" indicating a title of the operation screen; the description "<Voice> Audio 1 </Voice>" indicating voice-recognition information that is voice data; the description "<action> UI refresh </action>" indicating an action that matches the voice data; and other descriptions. If more than one voice data samples are registered, the screen information includes more than one sets of these descriptions.

Receiving the screen information from the application server 2, the MFP 1 creates a voice dictionary including voice data that can be obtained by voice entry and answer information indicating an action that matches the voice data, with their connection, based on the registered voice data samples and the screen information.

As described above, screen information of an operation screen is described in XML, and includes a title of the operation screen, voice-recognition information that is voice data, answer information indicating an action that matches the voice data and should be taken by the MFP 1. This would make creation of a voice dictionary easier.

A user speaks to perform an operation via an operation screen (see (5) of FIG. 6). Then, the MFP 1 identifies the message of voice obtained from the user-made voice, using the voice-recognition engine 10 (see (6) of FIG. 6), determines answer information that matches the voice data, and takes an action according to the answer information.

For example, if the answer information is an instruction to enter a predetermined value via the operation screen, the MFP 1 takes an action accordingly. If the answer information is an instruction to execute a job, the MFP 1 executes the job. If the answer information is an instruction to update the screen, the MFP 1 transmits a request for screen information of a next operation screen to the application server 2. Receiving the screen information from the application server 2, the MFP 1 creates a voice dictionary about the next operation screen in the same way described above, and also takes an action that matches the voice data obtained from the user-made voice, in the same way described above.

If the voice data obtained from user-made voice does not match any record in the voice dictionary, the MFP 1 may display a help screen or output a voice guide depending on the setting of the OpenAPI cooperation application.

Figure 7:
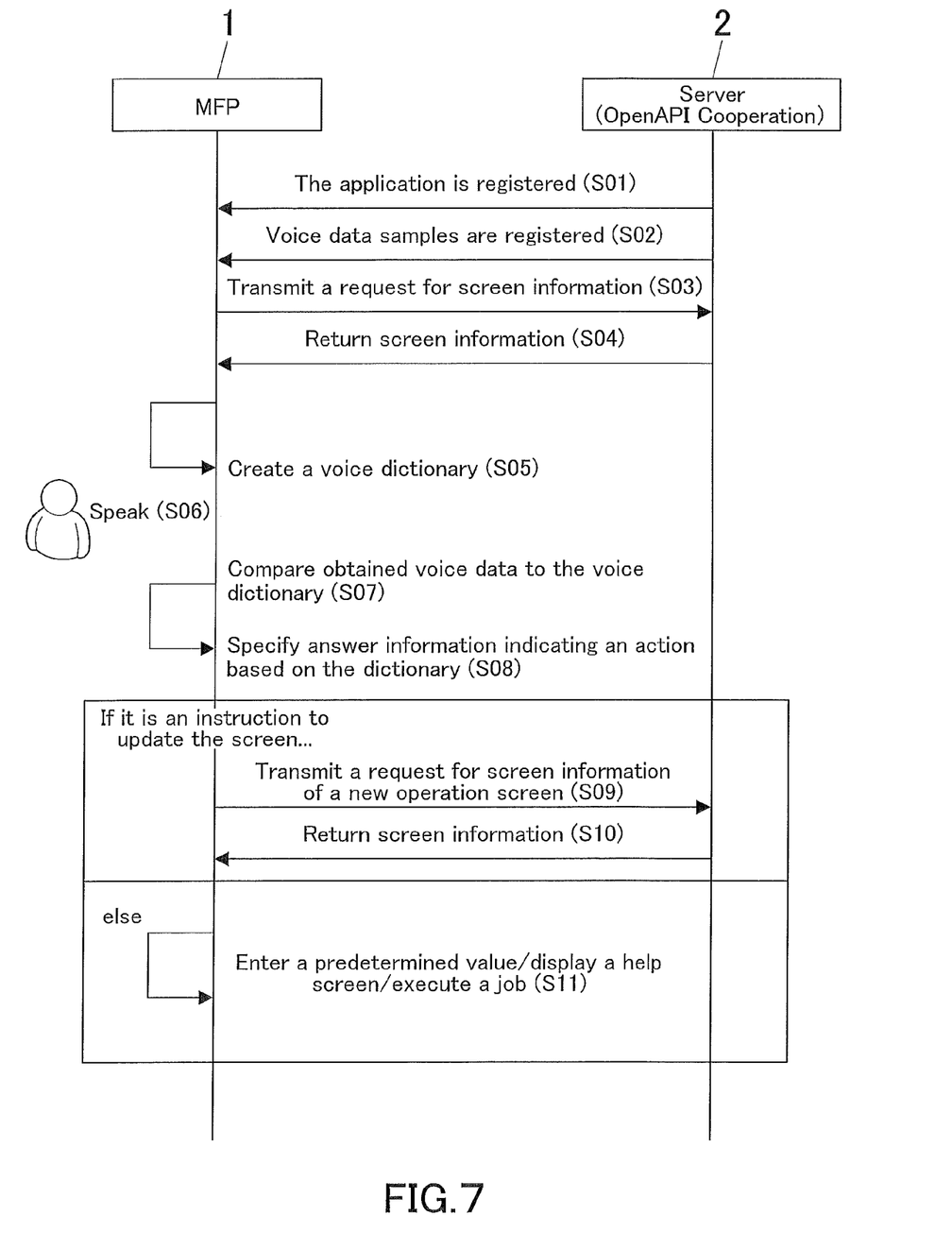
FIG. 7 is a flowchart representing the procedure explained with FIG. 6.

FIG. 7 is a flowchart representing the procedure explained with FIG. 6.

The OpenAPI cooperation application installed on the application server 2 is registered in the MFP 1 (Step S01), and voice data samples are also registered therein for the respective setting items (Step S02).

When the OpenAPI cooperation mode is turned "ON", the MFP 1 transmits a request for screen information to the application server 2 (Step S03). In response to the request, the application server 2 transmits the screen information to the MFP 1 (Step S04).

Receiving the screen information from the application server 2, the MFP 1 creates a voice dictionary including voice data that can be set about by voice entry and answer information indicating an action that matches the voice data, with their connection, based on the registered voice data samples and the screen information (Step S05).

A user speaks (Step S06). Then, the MFP 1 identifies the message of the user-made voice, using the voice-recognition engine 10, and compares the voice data to the created voice dictionary (Step S07). Subsequently, the MFP 1 determines answer information that matches the voice data (Step S08), and for example, transmits a request for screen information of a next operation screen to the application server 2 according to the answer information (Step S09). Receiving the screen information from the application server 2 (Step S10), the MFP 1 creates a voice dictionary about the next operation screen in the same way described above, and also takes an action that matches the voice data obtained from the user-made voice, in the same way described above.

If the answer information transmitted to the application server 2 is not an instruction to update the screen, a predetermined value is entered via the operation screen, a job is executed, a help screen is displayed, or alternatively a voice guide is outputted (Step S11).

Figure 8:
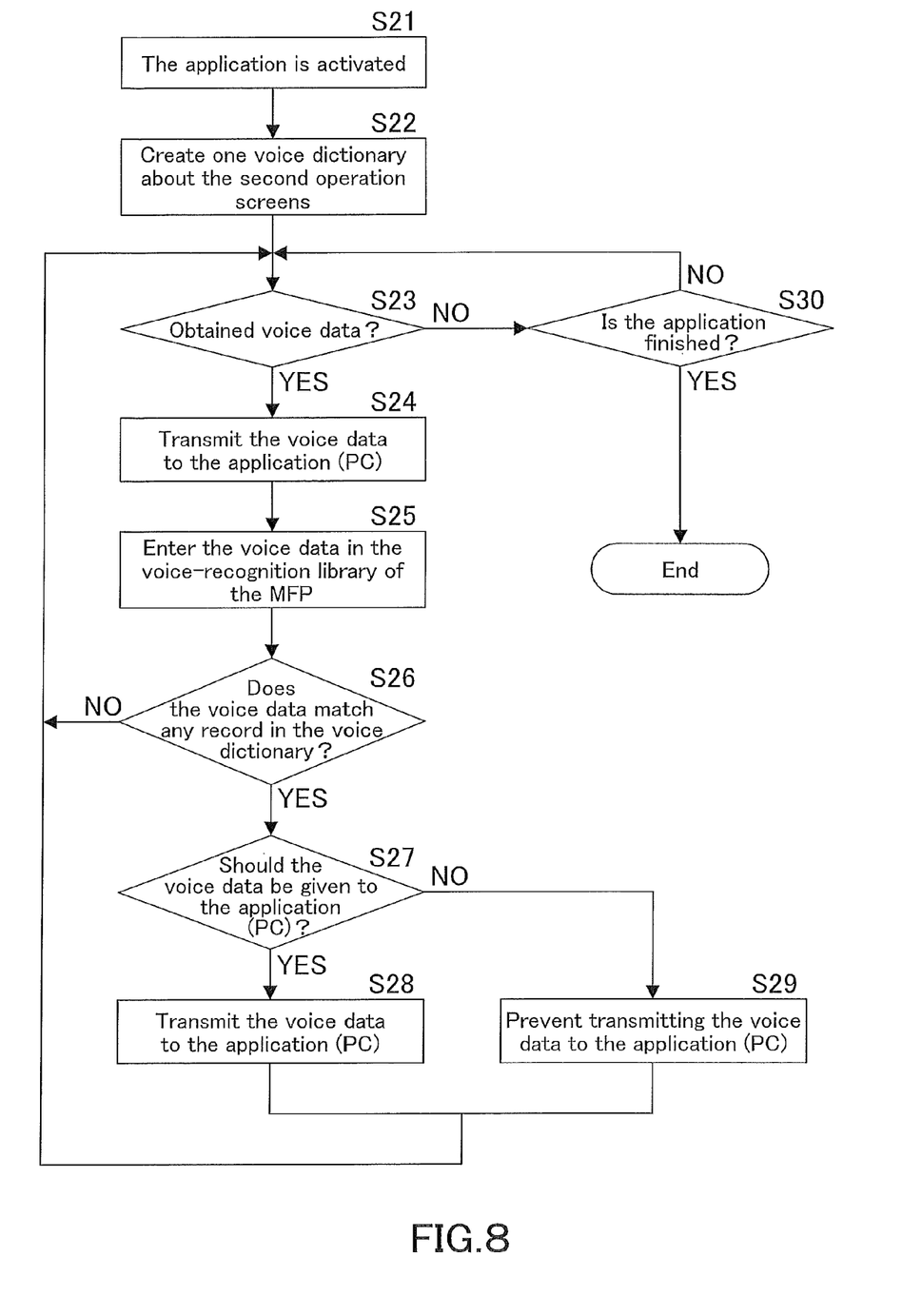
FIG. 8 is a flowchart representing a procedure executed by the image processing apparatus in another embodiment of the present invention.
Figure 9:
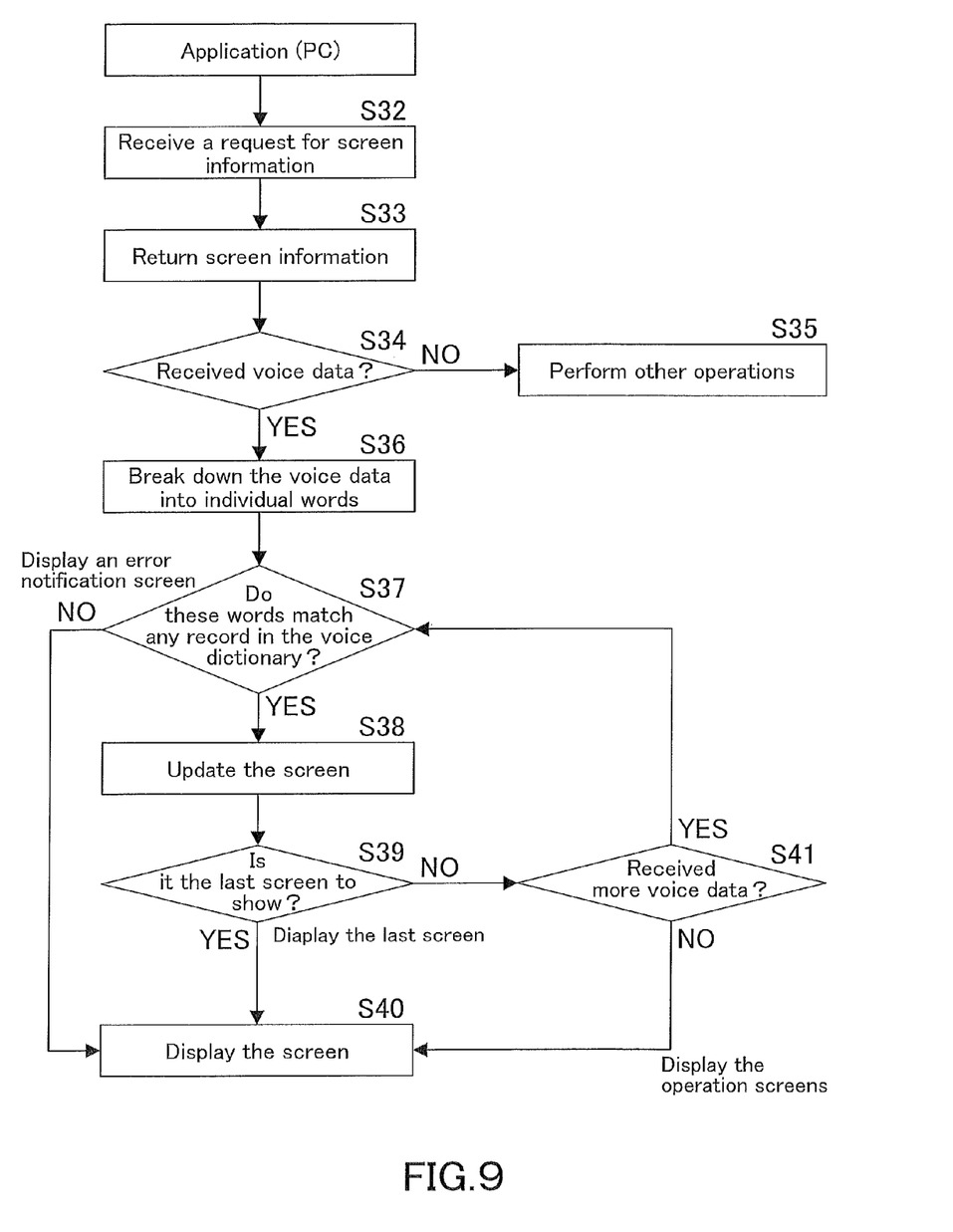
FIG. 9 is a flowchart representing a procedure executed by the information processing apparatus also in another embodiment of the present invention.

FIG. 8 and FIG. 9 relate to another embodiment of the present invention. In this embodiment, if a user speaks continuously, the application server 2 transmits to the MFP 1, answer information indicating the last action to take, without updating the screen.

As for the voice-recognition function of the MFP 1, voice dictionaries are registered in advance for the respective operation screens. And if voice data does not match any record in its voice dictionary, the voice data is discarded. Users often use only particular operation screens for regular operations in the OpenAPI cooperation mode. Contrary to the ordinary mode of the MFP 1, it takes time to update the screen in the OpenAPI cooperation mode, since screen information of a next screen needs to be obtained from the OpenAPI cooperation application.

This embodiment intends to reduce the processing time by eliminating the need of updating the screen, even if a user speaks continuously in the OpenAPI cooperation mode".

FIG. 8 is a flowchart representing a procedure executed by the MFP 1, and FIG. 9 is a flowchart representing a procedure executed by the server 2.

In the OpenAPI cooperation mode, the OpenAPI cooperation application is activated in Step S21. Then, one voice dictionary is created based on all voice dictionaries created about the MFP 1's own second operation screens, in Step S22.

In Step S23, it is judged whether or not a user speaks, in other words, voice data is obtained by voice entry. If it is not obtained (NO in Step S23), then it is further judged in Step S30, whether or not the OpenAPI cooperation application is finished (whether or not the OpenAPI cooperation mode is turned "OFF"). If it is not finished (NO in Step S30), the routine goes back to Step S23. If it is finished (YES in Step S30), the routine terminates.

If voice data is obtained (YES in Step S23), the voice data is transmitted to the OpenAPI cooperation application (to the application server 2) in Step S24.

Subsequently, the voice data is entered in the voice-recognition library 115 of the MFP 1 in Step S25. Then in Step S26, it is judged whether or not the voice data matches any record in the voice dictionary.

If it does not match any record (NO in Step S26), this means that the voice data cannot be identified using a voice dictionary of the MFP 1. Thus, the routine goes back to Step S23 to repeat Steps S23 through S26 and S30.

If the voice data matches a record (YES in Step S26), then it is further judged in Step S27, whether or not the voice data should be given to the OpenAPI cooperation application (to the application server 2). If it should be given to the OpenAPI cooperation application (YES in Step S27), it is transmitted to the OpenAPI cooperation application in Step S28, then the routine goes back to Step S23. If there is no need to give the voice data to the OpenAPI cooperation application (NO in Step S27), transmission of the voice data is prevented in Step S29, then the routine goes back to Step S23.

For example, even if a copy instruction is given by voice entry about a scan setting screen and obtained voice data matches a record in the voice dictionary, it is judged that the voice data should not be given to the OpenAPI cooperation application (to the application server 2).

As described above, first voice data obtained from user-made voice and second voice data that matches a record in the voice dictionary of the MFP 1 and should be given to the OpenAPI cooperation application, are transmitted to the OpenAPI cooperation application (the application serer 2). If a user speaks continuously to give a plurality of instructions, the MFP 1 executes processing sequentially according to these instructions.

On the end of the application server 2, a request for screen information of an initial screen is received from the MFP 1 in Step S32 of FIG. 9. Then, screen information of an operation screen is returned thereto in Step S33. And thus, an initial screen is displayed on the display 123*b* of the MFP 1.

Subsequently in Step S34, it is judged whether or not voice data is received therefrom. If it is not received (NO in Step S34), other operations are performed in Step S35.

If voice data is received (YES in Step S34), the voice data is broken down into individual words in Step S36, and it is judged in Step S37, whether or not these words match any record in a voice dictionary of the application server 2.

Here, first voice data entered about a first operation screen customized by the OpenAPI cooperation application and second voice data entered about a second operation screen of the MFP 1, displayed at the same time with the first operation screen can be differentiated from each other. Thus, by comparing voice data to a predetermined voice dictionary, it is easy to judge that it is first voice data that can be entered via the first operation screen or second voice data that can be entered via the second operation screen.

If those do not match any record in a voice dictionary of the application server 2 (NO in Step S37), screen information of an error notification screen is transmitted to the MFP 1 as answer information in Step S40, so that it can be displayed.

If those match a record in a voice dictionary of the application server 2 (YES in Step S37), the screen of the application server 2 is updated in Step S38, then in Step S39, it is judged whether or not the updated operation screen is the last screen to show. If it is the last screen to show (YES in Step S39), screen information of the last screen is transmitted to the MFP 1 as answer information in Step S40, so that it can be displayed.

If the next operation screen is not be the last screen to show (No in Step S39), then it is further judged in Step S41, whether or not more voice data is obtained. If more voice data is obtained (YES in Step S41), the routine goes back to Step S37, in which it is judged whether or not the voice data matches any record in the voice dictionary. If no more voice data is obtained (NO in Step S41), screen information of an operation screen before the last screen is transmitted to the MFP 1, as answer information in Step S40, so that it can be displayed.

If a user speaks continuously about the last screen to give an instruction, instead of screen information of the last screen, answer information indicating the last action to take, may be transmitted to the MFP 1 in Step S40.

As described above, in this embodiment, if a user speaks continuously, screen information of the last screen or answer information indicating the last action to take is transmitted to the MFP 1 without updating the screen. This could reduce the processing time.

Figure 10:
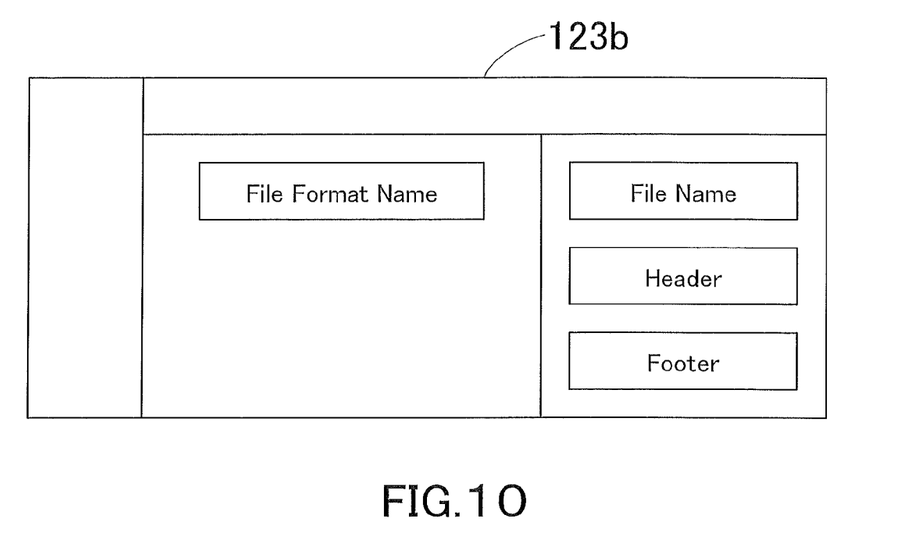
FIG. 10 is a view to explain yet another embodiment of the present invention.

FIG. 10 relates to yet another embodiment of the present invention. In this embodiment, when the OpenAPI cooperation application is registered in the MFP 1, a keyword that relates to a setting also can be registered in a voice dictionary thereof.

For example, a user speaks a file name as "XXX..PDF". Then, the word "PDF" matches a record since it is a file format name. However, the word "XXXX" does not match any record since it is an arbitrary word. In this embodiment, if voice data includes a keyword right before or after a file format name, which does not match any record in the voice dictionary, the voice data can be registered as a file name. The voice data "XXXX..PDF" may be registered in advance in the MFP 1 by operating the MFP 1, or alternatively the voice data may be registered in advance therein by operating the OpenAPI cooperation application, so that it can be recognized as a file name from its word "PDF".

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising an image processing apparatus and an information processing apparatus that are interconnected via a network, wherein:
the image processing apparatus comprises:
a display that displays on itself, a first operation screen customized by an application that is installed on the information processing apparatus to enable the image processing apparatus to implement a new function;
a voice data obtainer that obtains voice data from user-made voice entered about an operation screen displayed on the display; and
a transmitter that transmits the voice data obtained by the voice data obtainer and value data entered via the first operation screen, to the information processing apparatus,
the information processing apparatus comprises:
an application memory that records the application in itself;
a receiver that receives the voice data and the value data entered via the first operation screen, from the transmitter of the image processing apparatus;
a determiner that determines answer information indicating an action to be taken by the image processing apparatus, based on the received voice data, a voice dictionary owned by the application and the value data entered via the first operation screen; and
a transmitter that transmits the determined answer information to the image processing apparatus, and
the image processing apparatus further comprises:
a controller that takes an action according to the answer information received from the information processing apparatus.

2. The image processing system recited in claim 1, wherein:
the display of the image processing apparatus is capable of displaying at the same time, the first operation screen and a second operation screen of the image processing apparatus's own according to the application; and
when the message of the voice obtained by the voice data obtainer is identified using a voice dictionary owned by the application according to the setting of the application and the answer information is determined, the controller of the image processing apparatus takes an action about the first operation screen according to the answer information from the information processing apparatus, meanwhile when the message of the voice obtained by the voice data obtainer is identified using a voice dictionary owned by the image processing apparatus, the controller of the image processing apparatus takes an action about the second operation screen.

3. An image processing system comprising an image processing apparatus and an information processing apparatus that are interconnected via a network, wherein:
the image processing apparatus comprises:
a display that display on itself, an operation screen customized by an application that is installed on the information processing apparatus to enable the image processing apparatus to implement a new function;
a register that registers the application and further registers a voice data sample serving as a value set for each setting item according to this application;
a creator that creates a voice dictionary about the operation screen based on screen information of the operation screen and the registered voice data samples, when the screen information is received from the information processing apparatus;
a voice data obtainer that obtains voice data from user-made voice about the operation screen;
a determiner that determines answer information that matches the voice data obtained by the voice data obtainer, using the voice dictionary created by the creator; and
a controller that transmits to the information processing apparatus, a request for screen information of a next operation screen if the answer information determined by the determiner includes an instruction to update the screen, meanwhile takes an action according to the answer information if the answer information does not include an instruction to update the screen, and
the information processing apparatus comprises:
an application memory that records the application in itself; and
a transmitter that transmits to the image processing apparatus, a voice data sample to be registered and screen information of an operation screen.

4. The image processing system recited in claim 3, wherein:
the screen information of an operation screen is described in XML, and includes a title of the operation screen, voice-recognition information that is the voice data, answer information indicating an action that matches the voice data and should be taken by the image processing apparatus; and
the answer information includes at least one of the following instructions: an instruction to enter a user's set value via the operation screen; an instruction to update the screen; an instruction to execute a job; and an instruction to display a help screen or output a voice guide if the voice data does not match any record in the voice dictionary.

5. An image processing system comprising an image processing apparatus and an information processing apparatus that are interconnected via a network, wherein:
the image processing apparatus comprises:
a display that is capable of displaying a first operation screen customized by an application that is installed on the information processing apparatus to enable the image processing apparatus to implement a new function, and displaying at the same time, the first operation screen and a second operation screen of the image processing apparatus' own according to the application;

a voice dictionary creator that creates one voice dictionary based on a voice dictionary about the entire second operation screen;

a voice data obtainer that is capable of continuously obtaining voice data from user-made voice entered about the first operation screen, as first voice data;

a judger that judges whether or not the first voice data obtained by the voice data obtainer matches any record in the voice dictionary created by the voice dictionary creator, by comparing the first voice data to the voice dictionary, and if judges that the first voice data matches a record in the voice dictionary, further judges whether or not the first voice data should be given to the application; and a transmitter that transmits the first voice data continuously obtained by the voice data obtainer, to the information processing apparatus, and if the judger judges that the first voice data matches a records of voice data in the voice dictionary and also judges that the first voice data should be given to the application, further transmits thereto the voice data of the matching record, as second voice data, the information processing apparatus comprises:

an application memory that records the application in itself;

a receiver that receives the first voice data and the second voice data from the image processing apparatus;

a determiner that determines answer information that matches the first voice data and the second voice data received therefrom, after the last voice data is received; and a transmitter that transmits the determined answer information to the image processing apparatus, and the image processing apparatus further comprises:

a controller that takes an action according to the answer information received from the information processing apparatus.

6. The image processing system recited in claim 5, wherein:

the image processing apparatus further comprises a register that registers a keyword in the voice dictionary according to the application; and if the first voice data matches the keyword and does not match another keyword just before and/or after the keyword, the judger of the image processing apparatus judges that the first voice data matches a record in the voice dictionary.

7. An image processing apparatus connected to an information processing apparatus via a network, comprising:

a display that displays on itself, a first operation screen customized by an application that is installed on the information processing apparatus to enable the image processing apparatus to implement a new function;

a voice data obtainer that obtains voice data from user-made voice entered about the first operation screen displayed on the display;

a transmitter that transmits the voice data obtained by the voice data obtainer and value data entered via the first screen data, to the information processing apparatus;

a receiver that receives from the information processing apparatus, answer information matching the voice data, which is determined in the information processing apparatus based on a voice dictionary owned by the application and the value data entered via the first operation screen; and a controller that takes an action according to the answer information received therefrom.

8. The image processing apparatus recited in claim 7, wherein:

the display is capable of displaying at the same time, the first operation screen and a second operation screen of the image processing apparatus's own according to the application; and when the message of the voice obtained by the voice data obtainer is identified using a voice dictionary owned by the application according to the setting of the application and the answer information is determined, an action is taken about the first operation screen according to the answer information from the information processing apparatus, meanwhile when the answer information that matches the voice data obtained by the voice data obtainer is identified using a voice dictionary owned by the image processing apparatus, an action is taken about the second operation screen.

9. An image processing apparatus connected to an information processing apparatus via a network, comprising:

a display that displays on itself, an operation screen customized by an application that is installed on the information processing apparatus to enable the image processing apparatus to implement a new function;

a register that registers the application and further registers a voice data sample serving as a value for each setting item of this application;

a creator that creates a voice dictionary about the operation screen based on screen information of the operation screen and the registered voice data samples, when the screen information is received from the information processing apparatus;

a voice data obtainer that obtains voice data from user-made voice entered about the operation screen;

a determiner that determines answer information that matches the voice data obtained by the voice data obtainer, using the voice dictionary created by the creator; and a controller that transmits to the information processing apparatus, a request for screen information of a next operation screen if the answer information determined by the determiner includes an instruction to update the screen, meanwhile takes an action according to the answer information if the answer information does not includes an instruction to update the screen.

10. The image processing apparatus recited in claim 9, wherein:

the screen information of an operation screen is described in XML, and includes a title of the operation screen, voice-recognition information that is the voice data, answer information indicating an action that matches the voice data and should be taken by the image processing apparatus; and the answer information includes at least one of the following instructions: an instruction to enter a user's set value via the operation screen; an instruction to update the screen; an instruction to execute a job; and an instruction to display a help screen or output a voice guide if the voice data does not match any record in the voice dictionary.

11. An image processing apparatus connected to an information processing apparatus via a network, comprising:

a display that is capable of displaying a first operation screen customized by an application that is installed on the information processing apparatus to enable the image processing apparatus to implement a new function, and displaying at the same time, the first operation screen and a second operation screen of the image processing apparatus's own according to the application;

a voice dictionary creator that creates one voice dictionary based on a voice dictionary about the entire second operation screen;

a voice data obtainer that continuously obtains voice data from user-made voice entered about the first operation screen, as first voice data;

a judger that judges whether or not the first voice data obtained by the voice data obtainer matches any record in the voice dictionary created by the voice dictionary creator, by comparing the first voice data to the voice dictionary, and if judges that the first voice data matches a record in the voice dictionary, further judges whether or not the first voice data should be given to the application;

a transmitter that transmits the first voice data continuously obtained by the voice data obtainer, to the information processing apparatus, and if the judger judges that the first voice data matches a records of voice data in the voice dictionary and also judges that the first voice data should be given to the application, further transmits thereto the voice data of the matching record, as second voice data;

a receiver that receives answer information that matches the first voice data and the second voice data, determined by the information processing apparatus after the information processing apparatus receives the last voice data; and a controller that takes an action according to the answer information received therefrom.

12. The image processing apparatus recited in claim 11, further comprising:

a register that registers a keyword in the voice dictionary according to the application, and wherein:

if the first voice data matches the keyword and does not match another keyword just before and/or after the keyword, the judger judges that the first voice data matches a record in the voice dictionary.

13. An information processing apparatus employed in an image processing system comprising an image processing apparatus and an information processing apparatus that are interconnected via a network, wherein:

the image processing apparatus comprises:

a display that is capable of displaying a first operation screen customized by an application that is installed on the information processing apparatus to enable the image processing apparatus to implement a new function, and displaying at the same time, the first operation screen and a second operation screen of the image processing apparatus' own according to the application;

a voice dictionary creator that creates one voice dictionary based on a voice dictionary about the entire second operation screen;

a voice data obtainer that is capable of continuously obtaining voice data from user-made voice entered about the first operation screen, as first voice data;

a judger that judges whether or not the first voice data obtained by the voice data obtainer matches any record in the voice dictionary created by the voice dictionary creator, by comparing the first voice data to the voice dictionary, and if judges that the first voice data matches a record in the voice dictionary, further judges whether or not the first voice data should be given to the application; and a transmitter that transmits the first voice data continuously obtained by the voice data obtainer, to the information processing apparatus, and if the judger judges that the first voice data matches a records of voice data in the voice dictionary and also judges that the first voice data should be given to the application, further transmits thereto the voice data of the matching record, as second voice data, the information processing apparatus comprises:

an application memory that records the application in itself;

a receiver that receives the first voice data and the second voice data from the image processing apparatus;

a determiner that determines answer information that matches the first voice data and the second voice data received therefrom, after the last voice data is received; and a transmitter that transmits the determined answer information to the image processing apparatus, and the image processing apparatus further comprises:

a controller that takes an action according to the answer information received from the information processing apparatus.

14. The information processing apparatus, recited in claim 13, wherein:

the image processing apparatus in the image processing system further comprises a register that registers a keyword in the voice dictionary according to the application; and if the first voice data matches the keyword and does not match another keyword just before and/or after the keyword, the judger of the image processing apparatus judges that the first voice data matches a record in the voice dictionary.

* * * * *